United States Patent
Sng et al.

(10) Patent No.: US 9,936,036 B2
(45) Date of Patent: Apr. 3, 2018

(54) METHOD AND SYSTEM FOR INDIRECTLY ESTABLISHING A UNIQUE COMMUNICATION CHANNEL BETWEEN A PLURALITY OF DEVICES

(75) Inventors: Swee Huat Sng, Torrance, CA (US); Lena Sojian, Fountain Valley, CA (US)

(73) Assignee: SHARP LABORATORIES OF AMERICA, INC., Camas, WA (US)

( * ) Notice: Subject to any disclaimer, the term of this patent is extended or adjusted under 35 U.S.C. 154(b) by 993 days.

(21) Appl. No.: 13/284,652

(22) Filed: Oct. 28, 2011

(65) Prior Publication Data

US 2013/0111009 A1    May 2, 2013

(51) Int. Cl.
*G06F 15/173* (2006.01)
*H04L 29/08* (2006.01)
*H04W 28/02* (2009.01)

(52) U.S. Cl.
CPC ..... *H04L 67/2809* (2013.01); *H04W 28/0284* (2013.01)

(58) Field of Classification Search
CPC ...... G06F 3/1288; G06F 3/1229; G06F 3/126; H04L 67/2809
See application file for complete search history.

(56) References Cited

U.S. PATENT DOCUMENTS

| | | | |
|---|---|---|---|
| 7,130,584 B2 | 10/2006 | Hirvonen | |
| 7,463,378 B2 * | 12/2008 | Williams et al. | 358/1.15 |
| 7,813,715 B2 | 10/2010 | McKillop et al. | |
| 8,077,334 B2 * | 12/2011 | Cordesses et al. | 358/1.15 |
| 8,493,579 B2 * | 7/2013 | Tecu et al. | 358/1.13 |
| 2003/0067624 A1 * | 4/2003 | Anderson et al. | 358/1.15 |
| 2005/0044479 A1 * | 2/2005 | Willams | G06F 3/1222 715/273 |
| 2007/0247395 A1 * | 10/2007 | Barraclough | H04L 67/06 345/51 |
| 2008/0080508 A1 * | 4/2008 | Das | H04L 12/4633 370/392 |
| 2008/0252910 A1 * | 10/2008 | Cordesses et al. | 358/1.1 |
| 2010/0278345 A1 | 11/2010 | Alsina et al. | |
| 2010/0309510 A1 * | 12/2010 | Hansen | G06F 3/1203 358/1.15 |
| 2012/0221650 A1 * | 8/2012 | Bhogal | H04L 67/2842 709/206 |
| 2013/0094047 A1 * | 4/2013 | Bailey | H04L 63/18 358/1.14 |

FOREIGN PATENT DOCUMENTS

WO    WO2007117606 A2    10/2007

\* cited by examiner

*Primary Examiner* — Mohamed Ibrahim
(74) *Attorney, Agent, or Firm* — Brooks Acordia IP Law, PC; Pejman Yedidsion; David Ripma (57) ABSTRACT

Systems, devices, and methods for determining a unique identifier associated with a resource provider based on a received first pairing request from the resource provider identifying the resource provider as available to one or more resource requestors, sending the unique identifier to the resource provider, receiving a second pairing request from a resource requestor, wherein the request comprises the unique identifier associated with the resource provider, and initiating a communication channel between the resource provider and the resource requester, wherein the initiating is based on the unique identifier.

16 Claims, 7 Drawing Sheets

METHOD AND SYSTEM FOR INDIRECTLY ESTABLISHING A UNIQUE COMMUNICATION CHANNEL BETWEEN A PLURALITY OF DEVICES

BACKGROUND

To allow interoperability between embedded smart devices over a network connection, one embedded device may associate with another embedded device in order to securely and reliably communicate and exchange data over the network connection. As an example, a data communication channel may be established, via a communicative association, between a portable device and a stationary device. A communication channel between the devices may, for example, facilitate the sharing of content such as: pictures, contacts, and/or music.

SUMMARY

Embodiments include methods, systems, and devices where, for example a method embodiment may include the steps of: (a) determining, by a first computing device, a unique identifier associated with a resource provider, based on a received first pairing request from the resource provider identifying the resource provider as available to one or more resource requestors; (b) sending, by the first computing device, the unique identifier to the resource provider; (c) receiving, by the first computing device, a second pairing request from a resource requestor, where the request comprises the unique identifier associated with the resource provider; and (d) initiating, by the first computing device, a communication channel between the resource provider and the resource requester, where the initiating is based on the unique identifier. In some embodiments, the method may further include the step of: displaying, by the resource provider, the received unique identifier. Optionally, determined unique identifier is generated at the first computing device via a lookup table, the lookup table comprising a set of available resources.

In some embodiments the method may further include the step of: invoking, by a second computing device, a communication channel to effect data transmission between the resource provider and the resource requester, where the invocation is based on the initiated communication channel of the resource provider and the resource requester. Optionally, the resource provider may be a multifunction peripheral (MFP) device or a portable mobile device. In some embodiments the first pairing request from the resource provider may be sent when the resource provider is powered on or when the resource provider is connected to the first computing device via a network connection. In some embodiments the method may further include the step of: (a) monitoring, by the first computing device, the status of the initiated communication channel, where the status is based on at least one of: a received notification from the resource requester; and a received notification from the resource provider; and (b) determining the presence of a disconnect in the communication channel between the resource provider and the resource requester.

Other embodiments include methods, systems, and devices where, for example a device embodiment may include a processor configured to (a) receive a first pairing request from a resource provider; (b) determine a unique identifier associated with the resource provider based on the received first pairing request from the resource provider; (c) send the unique identifier associated with the resource provider to the resource provider; and (d) initiate a communication channel based on a received pairing request from a resource requester and the unique identifier, where the pairing request from the resource requester comprises the unique identifier. The device embodiment may also include the processor configured to generate the unique identifier via a lookup table, the lookup table comprising a set of available resources. Optionally, the processor of the device embodiment is further configured to: (a) monitor the status of the initiated communication channel, where the status is based on at least one of: a received notification from the resource requester; and a received notification from the resource provider; and (b) determine the presence of a disconnect in the communication channel between the resource provider and the resource requester.

Other embodiments include methods, systems, and devices where, for example a system embodiment may include: (i) a resource provider comprising a processor configured to send a first pairing request for a unique identifier associated with the resource provider; and (ii) a computing device comprising a processor configured to: (a) receive the first pairing request from the resource provider; (b) determine the unique identifier based on the received first pairing request from the resource provider; and (c) initiate a communication channel based on a received pairing request from a resource requester and the unique identifier associated with the resource provider, and wherein the pairing request from the resource requester comprises the unique identifier.

Other embodiments include methods, systems, and devices where, for example a system embodiment may include: a first computing device, operably coupled to a resource provider via a communication medium, the first computing device configured to send a set of one or more unique identifiers, the first computing device comprising: (i) a memory configured to store the set of one or more unique identifiers; (ii) a processor configured to: (a) receive a first pairing request from the resource provider for a unique identifier associated with the resource provider; and (b) initiate a communication channel based on a received pairing request from a resource requester and the unique identifier associated with the resource provider, where the unique identifier is generated based on the received first pairing request from the resource provider; and where the pairing request from the resource requester comprises the unique identifier.

Optionally, in the system embodiment, the unique identifier is generated via a lookup table, the lookup table comprising a set of available resources. Optionally, the system embodiment may further include a second computing device comprising a processor configured to: invoke a communication channel to effect data transmission between the resource provider and the resource requester, where the invocation is based on the initiated communication channel of the resource provider and the resource requester. In one embodiment of the system, the processor is further configured to: (a) monitor the status of the initiated communication channel, where the status is based on at least one of: a received notification from the resource requester; and a received notification from the resource provider; and (b) determine the presence of a disconnect in the communication channel between the resource provider and the resource requester.

BRIEF DESCRIPTION OF THE DRAWINGS

Embodiments are illustrated by way of example and not limitation in the figures of the accompanying drawings, and in which.

DETAILED DESCRIPTION

In a computer networked environment comprising a plurality of networked processing nodes, a computing device may host a virtual network computing server that may be connected to a resource provider—that may be embodied as a resource provider node, and a resource requester—that may be embodied as a resource requester node. In some embodiments, an MFP device may act as the resource provider, and a mobile device may act as the resource requester. A resource provider may be, for example, a multi-function peripheral (MFP) device used to print and fax information from a computing device in communication, e.g., networked, with the MFP device. An MFP device may additionally be configured to scan sheets of documents and transmit the scanned sheets, in electronic form, to computing devices. In computing networks, the MFP device may be configured as a peripheral equipment and may comprise a processor and memory. In addition, the MFP device may execute one or more applications and/or scripts at the MFP device. A resource requester may comprise a processor and memory and may be, for example, a mobile device, smart phone device, and/or portable media player. In addition, the mobile device may execute one or more applications and/or scripts.

Figure 1A:
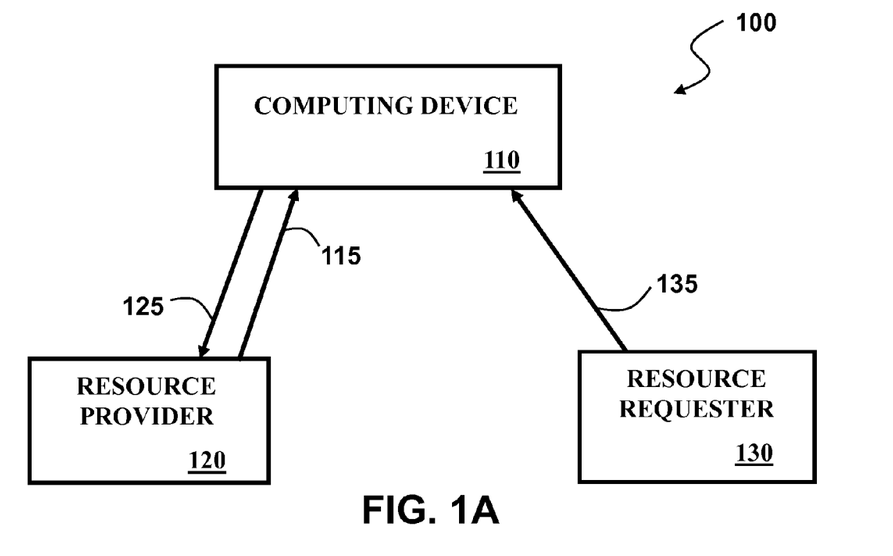
FIG. 1A depicts an exemplary embodiment of a computing system that includes a computing device, a resource provider node, and a resource requester node.

FIG. 1A depicts an exemplary embodiment of a computing system 100 comprising a computing device 110, a resource provider node 120, and a resource requester node 130. In some embodiments, the computing device 110 receives a message 115, e.g., an indication or a request, from the resource provider 120 indicating that it may be available for establishing a connection with another node based on an association that may be established by the computing device 110. In some embodiments, the computing device 110 may determine a unique identifier associated with the resource provider 120, and upon the determination of the unique identifier by the computing device 110, a message 125, e.g., an indication or a response, may be sent to the resource provider 120 comprising the unique identifier. In some embodiments, a resource requester 130 may initiate a message 135, e.g., an indication or a request to the computing device 110, where the request may comprise the unique identifier associated with the resource provider 120.

In some embodiments, the computing device 110 may utilize a number of methods and combinations to associate the resource requestor 130 with the resource provider 120, for example, sensor readings, timing information of requests, network information, and/or other information that may be obtained from each device. The computing device 110 may then initiate a communication channel between the resource provider 120 and the resource requester 130 based on the received requests 115, 135. In one embodiment, the resource provider 120 and resource requester 130 may be connected to their own respective networks through different data communications media, for example, a physical transmission medium, i.e., a wired communication channel; a logical connection over a multiplexed medium, i.e., a radio communication channel; and/or a non-physical transmission medium, i.e., a wireless communication channel.

A pairing between multiple devices may be initiated via a pairing process, where the pairing process may be used to establish a unique communication channel between two devices, e.g., a resource provider and resource requester. The unique communication channel may be established via a third device, e.g., a computing device 110, where the computing device 110 may uniquely identify and/or assign a unique pairing code to the resource provider 120 and resource requester 130. The pairing code may be used by the computing device 110 in the pairing process to identify the resource provider 120 and resource requester 130 that are requesting to be paired together. Optionally, the pairing code may be used in the pairing process in order to securely establish the unique communication channel. In some embodiments, the computing device may effect a communicative association between the resource provider 120 and resource requester 130 where the communicative association may be initiated by a resource provider 120, e.g., via sending a request to the computing device, and a resource requester 130, e.g., initiating a request—comprising a pairing code—to the computing device 110.

In the exemplary embodiment of FIG. 1A, the resource provider 120 may request a pairing code from the computing device 110, and upon receiving the pairing code, may display the pairing code on the resource provider 120, which may be visible to the resource requester 130—where the resource requester 130 may be in a distance proximate to the resource provider 120. Optionally, the pairing code may be displayed, e.g., as a Quick Response code (QR code) image, a barcode, alphanumeric characters, or other formats that may identify the pairing code. The resource requester 130 requesting to pair may then obtain the device pairing code—that may be displayed on the resource provider 120—from the resource provider 120. Optionally, the resource requester 130 may capture the image of the barcode or QR code via an image capturing device, e.g., camera, on the resource requester 130, and decode the captured barcode or QR code in order to extract the pairing code of the resource provider 120. The resource requester 130 may submit a pairing request message to the computing device 110 that may contain the pairing code of the resource provider 120. In one embodiment, the computing device 110 may establish a communication channel between the resource provider 120 and resource requester 130 based on associating the pairing code received in the pairing request message of the resource requester 130, with the pairing code of the resource provider 120—to which the pairing code was originally issued.

Figure 1B:
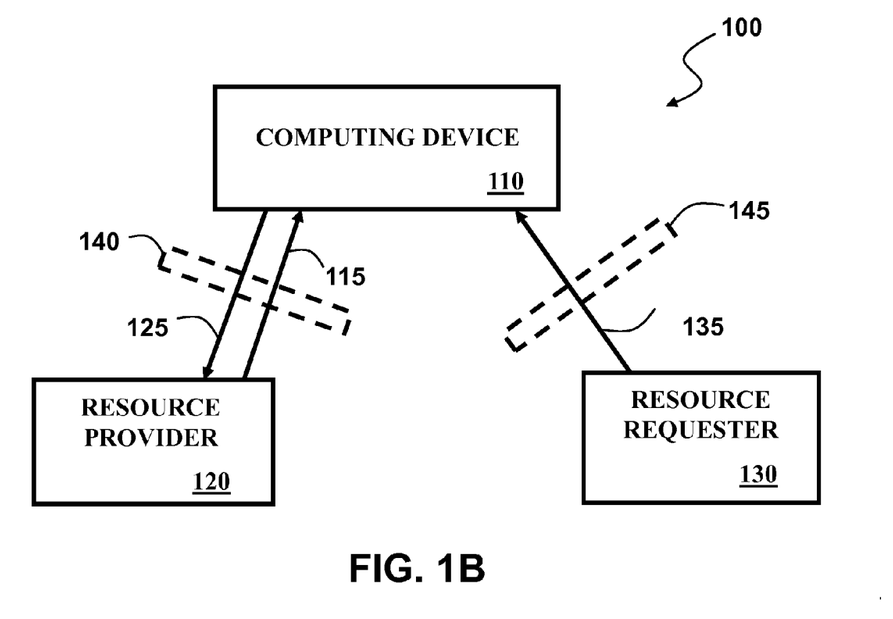
FIG. 1B depicts an exemplary embodiment of a computing system that includes a computing device, a resource provider node, a resource requester node, and optionally a first firewall and a second firewall.

FIG. 1B depicts an exemplary embodiment of the computing system 100 of FIG. 1A, comprising a computing device 110, a resource provider node 120, a resource requester node 130, and optionally a first firewall 140 and a second firewall 145. In some embodiments, the first firewall 140 may reside between the computing device 110 and the resource provider 120. In some embodiments, the second firewall 145 may reside between the computing device 110 and the resource requester 130. The first firewall 140 and second firewall 145 may reside in the system depicted in FIG. 1B, where both the resource provider 120 and resource requester 130 are outside of the network of the computing device 110. Optionally, the computing system 100, comprising the firewall 140, 145, may be implemented via a virtual network connection, e.g., VLAN, VPN, and/or VPLS.

Figure 1C:
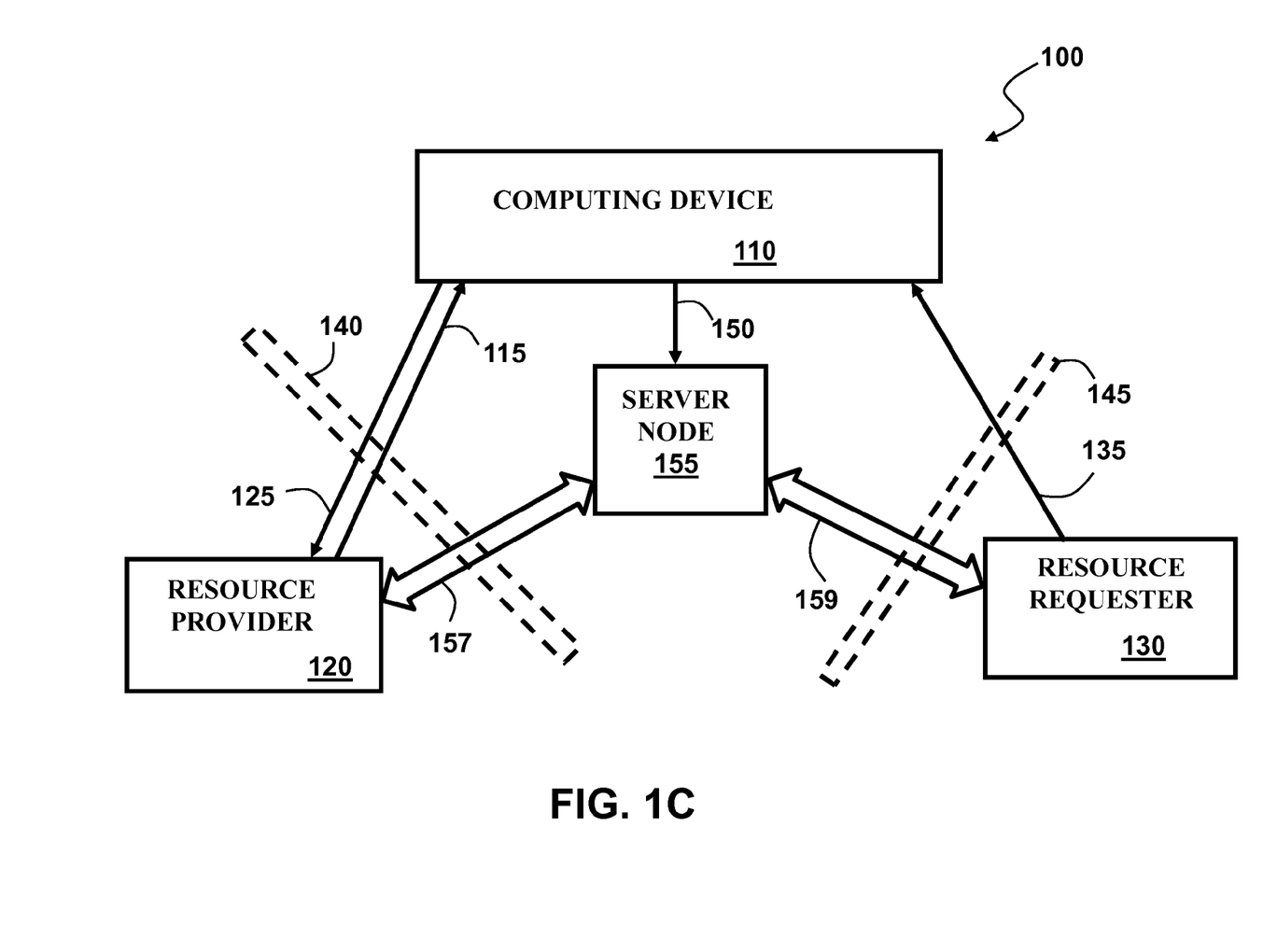
FIG. 1C depicts an exemplary embodiment of a computing system that includes a computing device, a resource provider node, a resource requester node, and a data exchange server node.

FIG. 1C depicts an exemplary embodiment of the computing system 100 of FIG. 1A, comprising a computing device 110, a resource provider node 120, a resource requester node 130, a server node, e.g., a data exchange server 155, and an optional first firewall 140 and optional second firewall 145. Optionally, the computing device 110 may be external to the resource provider 120 and resource requester 130 behind the optional set of one or more network firewalls 140, 145. In some embodiments, the data exchange server 155 may be used for data transmission, i.e., used to transfer data, via an established data channel, between the resource provider 120 and the resource requester 130. In some embodiments, the data exchange server 155 may be external to the resource provider 120 and resource requester 130 behind the optional set of one or more network firewalls 140, 145. In some embodiments, where the resource requester 130 and resource provider 120 may be protected by an optional set of one or more network firewalls 140, 145, the data exchange server 155 may be present to effect the exchanging of data between the devices. Optionally, once the computing device 110 has established a communication channel, the computing device 110 may provide, via transmitting to the data exchange server 155, a set of one or more attributes 150 to effect the transferring of data between the resource provider 120 and the resource requester 130. In an embodiment where the resource provider 120 and resource requester 130 are deployed within a network environment comprising a set of one or more optional network firewalls, the data exchange server 155 may act as a medium to transmit the messages, e.g., payload data, between the resource provider 120 and resource requester 130. Optionally, the data exchange server 155 may establish a unique set of data channels, e.g., a data channel 157 with the resource provider 120 and a data channel 159 with the resource requester 130. Optionally, when the data channels 157, 159 are established, the resource provider 120 and resource requester 130 may invoke data communication via the established data channels 157, 159.

In one embodiment, a firewall may be any number of security schemes that functionally attempts to prevent unauthorized access to a computing device or a network of computing devices, and in doing so, may monitor transfers of information to and from the computing device and/or the network of computing devices. Optionally, one or more multi-function peripheral (MFP) devices may be behind a firewall where the one or more MFP devices are networked with a web server for accessing resources specific to each MFP device via an access control process. In addition, the access control process within the firewall may allow access to the resources of the MFP devices from one or more authorized resources from outside the firewall. In some embodiments, a server node may establish the communication channel between the devices via a secure protocol, e.g., Hypertext Transfer Protocol/Hypertext Transfer Protocol Secure (HTTP/HTTPS). Some embodiments may employ Simple Object Access Protocol (SOAP) over HTTP, i.e., protocols that offer device access over proxies and firewalls.

In an embodiment depicted in FIG. 1C, where a data exchange server may effect a communication channel, via acting as a facilitator to facilitate communications between the resource provider and resource requester, the resource provider and resource requester may receive notification of pairing having been established. In some embodiments, the data exchange server may be reachable by both the resource provider and resource requester. Optionally, the data exchange server may act as a proxy for each device that may relay communication data between the two devices or alternatively, the data exchange server may operate like a pass-through server. In some embodiments, modification of the data being transmitted may be necessary where one device may send an HTTP request to the data exchange server that may be intended for the device it is currently paired with. Optionally, the data exchange server may modify the data, e.g., the HTTP header field, so that the request may be handled according to a set of rules established by the intended target device. Other network protocols may need modification and/or transformation of the data where host information may be included in the payload.

In one embodiment, the communication channel may serve as a medium to pair multiple devices, e.g., resources or smart devices, with each other. Once paired, the devices may communicate and exchange data with each other. In some embodiments, a portable device may, for example, request to pair with an MFP device in order to initiate print jobs or scan jobs. Optionally, data that may be transferred between the portable device and the MFP device may be either the print data file or scan image data. In another embodiment, a portable device may, for example, request to pair with a television (TV) in order to remotely change TV channels or other TV settings, e.g., volume, contrast, etc. Optionally, data that may be transferred between the portable device and the TV may comprise control commands. In some embodiments, the established communication channel may allow for the sharing of content, e.g., call logs, pictures, music, documents, and video.

Computing Device

The computing device may be a server application running, for example, on a publicly-accessible host. The computing device may maintain a table of devices requesting to be paired. The computing device may determine the devices requesting to be paired based on the events that may be submitted to the server. The data format for submitting events may be designed in such a way that the format may not be limited to only one specific event-type, e.g., an accelerometer event. Optionally, the data format may be extensible and allow for specifying different event types. Accordingly, any technology, protocol, and/or data format, may be supported by the computing device. In one exemplary embodiment, the communication channel between the resource provider and/or resource requester and the computing device may be via an internet protocol, e.g., HTTP, HTTPS, that may be supported by, for example, network gateways, routers, firewalls, and/or proxies. In one embodiment, the computing device may also monitor the status of active connections in order to detect disconnects between the paired devices, e.g., termination of the established data channel. Disconnects may be determined either via a monitoring mechanism within the computing device or via explicit event notifications from the resource requester or resource provider. In one embodiment, the resource requester or resource provider may send a signal to the computing device indicating that the established data channel has been severed.

Resource Requester App

A resource requester application (app) may be an app running on the resource requester that may communicate with the computing device. In one embodiment, upon initiating the pairing process, the resource requester app may submit event data to the computing device, where the specific event sent may be independent of the system and/or network implementation. In another embodiment, the resource requestor app may submit command requests to the computing device, where the specific commands may be associated with the resource provider. Additionally, the event may be associated with a hardware sensor residing on the resource requester device, where the event may be triggered, for example, via: an optical light level through an ambient light sensor; an audio level through a microphone; an image data through a built-in camera sensor; and/or a button press. In some exemplary embodiments, the event may be trigged using an image capture device, e.g., camera, to scan a QR code or a barcode, where a unique identifier for the device may be scanned, and submitted as an event to the computing device. In some embodiments, the unique identifier may be a device identifier encoded as QR code, barcode, or some other readable format. In one embodiment, an ambient light sensor residing on the resource requester may read and decode an event triggered by, for example, the flashing of the front panel of the resource provider according to an encoded device unique identifier, encoded, as an example, in Morse code. In one embodiment, the resource provider may play a frequency-modulated version of the device identifier through one or more speakers connected to the device, and the resource requester may then capture and demodulate the frequency-modulated version of the device identifier via a microphone on the resource requester.

Resource Provider App

A resource provider app may be an app running on the resource provider that may communicate with the computing device. In some embodiments, the resource provider app may submit event data to the computing device, when, for example, the pairing process is initiated, the device is powered on, or a specific initialization request is made, where the specific event sent may be independent of the system and/or independent of the network implementation. In some embodiments, the resource provider may be a legacy device that may have limited hardware sensor support; additionally, the resource provider may be of a different device type than the resource requester, for example, a smart phone (as a resource requestor) and an MFP device (as a resource provider), where they may not support the same sensor types. In the example of a smart phone pairing with an MFP device, a unique identifier may be the device ID of the MFP device. The MFP may submit the event to the computing device before the pairing process, in order that, for example, an entry may be created in a table associating the device, e.g., MFP, with the unique identifier. Optionally, the table may be maintained by the computing device. In one embodiment, the smart phone (as a resource requestor) may submit the decoded device identifier as an event to the computing device, and the computing device may dynamically associate, i.e., pair using the pairing code, the two devices. Optionally, the MFP and smart phone may then both be notified, via a message sent to them by the computing device, of the established pairing. In another embodiment, the resource provider app may submit event data to the computing device to initiate a disconnect from the resource requestor.

Figure 2A:
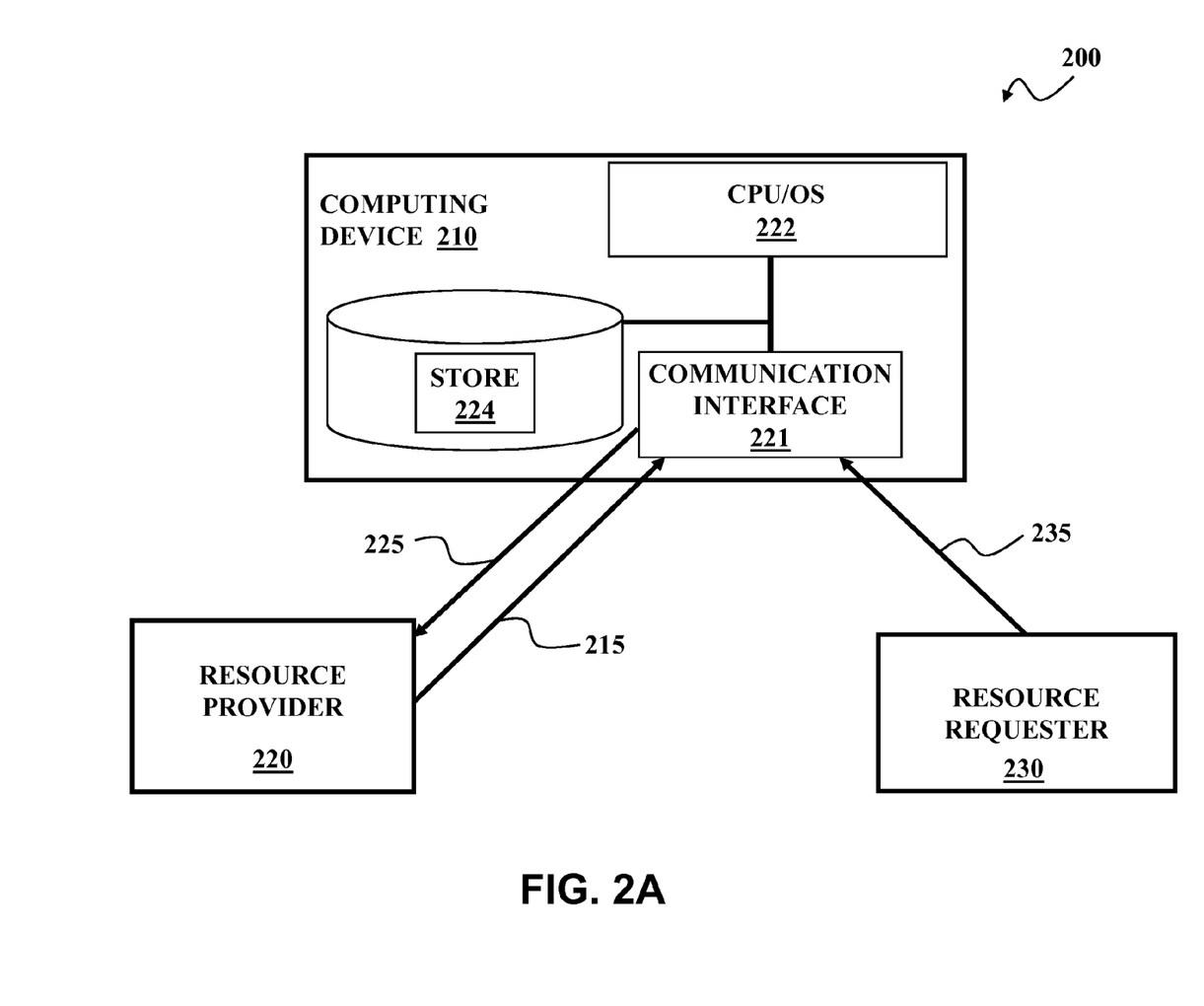
FIG. 2A depicts an exemplary embodiment of a computing system that includes a computing device, a resource provider node, and a resource requester node, the nodes depicted as networked via a communication medium, e.g., one or more communication channels.

FIG. 2A depicts an exemplary embodiment of a computing system 200 of FIG. 1A—in greater detail—comprising a computing device 210, a resource provider node 220, and a resource requester node 230, networked via a communication medium. In some embodiments, the computing device 210 is illustrated as having a communication interface 221, a CPU 222 having an OS configured to host a server and to access a data store 224, e.g. for storing a table. In this exemplary embodiment, the communication interface 221 of the computing device 210 receives a message 215, e.g., an indication or a request, from the resource provider 220 indicating that it may be available for establishing a connection with another node. In some embodiments, the computing device 210 may determine a unique identifier associated with the resource provider 220 and upon the determination of the unique identifier by the computing device 210, a message 225, e.g., an indication or a response, may be sent to the resource provider 220 comprising the unique identifier. In one embodiment, the computing device 210 may store received information, e.g., networking information of the resource provider 220, in a lookup table for referencing in subsequent pairing requests from the resource provider 220. Optionally, the received information may be stored in a storage medium, e.g., a hard disk, memory, external Universal Serial Bus storage, and/or networked servers, where the storage medium may be accessible to the computing device 210. In some embodiments, the computing device 210 may determine the unique identifier by, for example, employing a lookup table, a random key generator, a two-dimensional array comprising predetermined unique identifiers, and/or any other method or combination that may be used to assign a unique identifier to the resource provider 220. In some embodiments, a resource requester 230 may initiate a message 235, e.g., an indication or a request to the computing device 210, where the request may comprise the unique identifier associated with the resource provider 220. In some embodiments, the computing device 210 may utilize a number of methods and combinations to associate the resource requestor 230 with the resource provider 220, and then initiate a communication channel between the resource provider 220 and the resource requester 230.

Figure 2B:
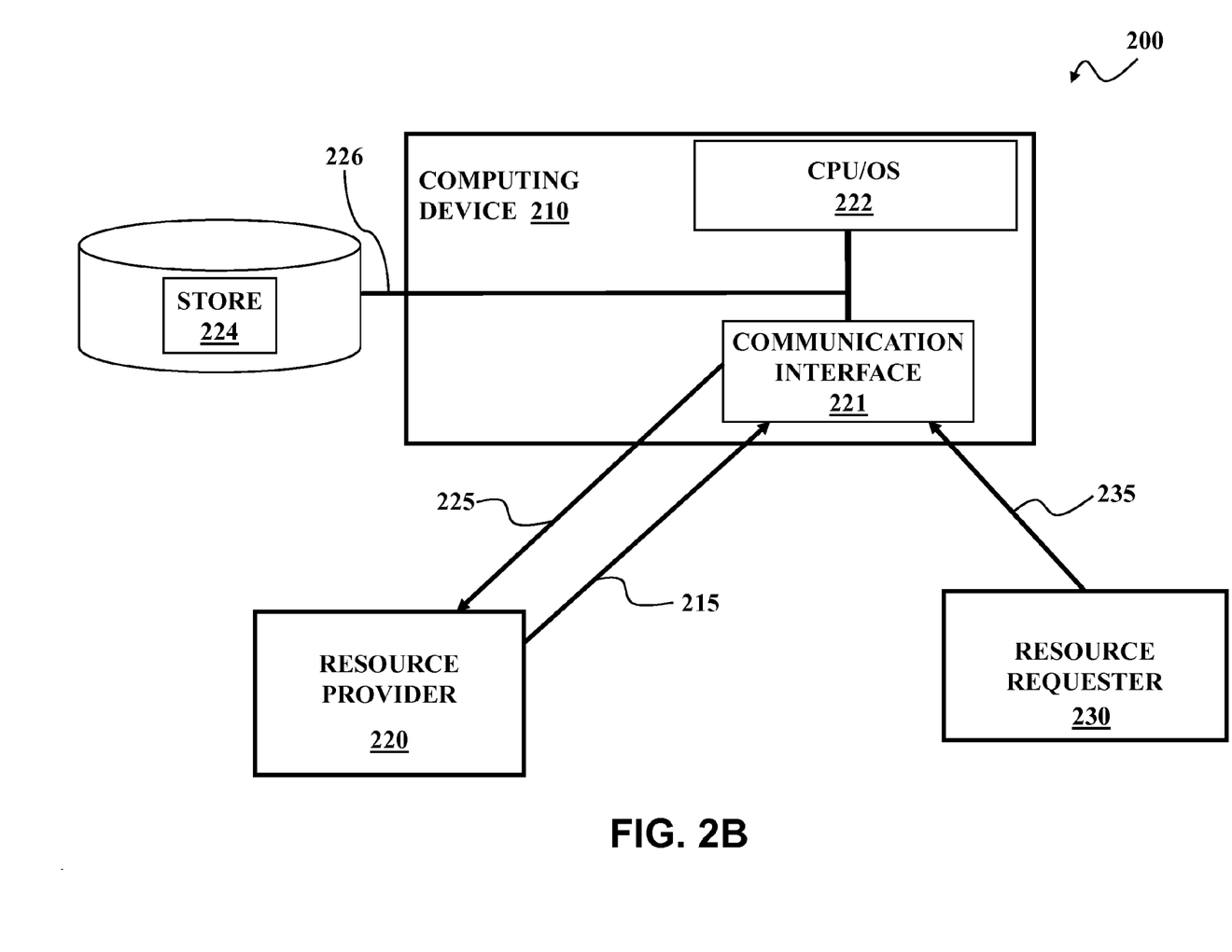
FIG. 2B depicts a computing system where the data store resides remote from the computing device.

FIG. 2B depicts the computing system 200 of FIG. 2A where the data store 224 resides outside of the computing device 210, and where the data store 224 and computing device 210 communicate via a communication medium 226. In some embodiments, the data store 224 may provide to the computing device the unique identifiers for the association of the resource provider 220 and resource requester 230, responsive to one or more communications 215 from the resource provider 220 and/or one or more communication 235 from the resource requester 230.

Figure 3:
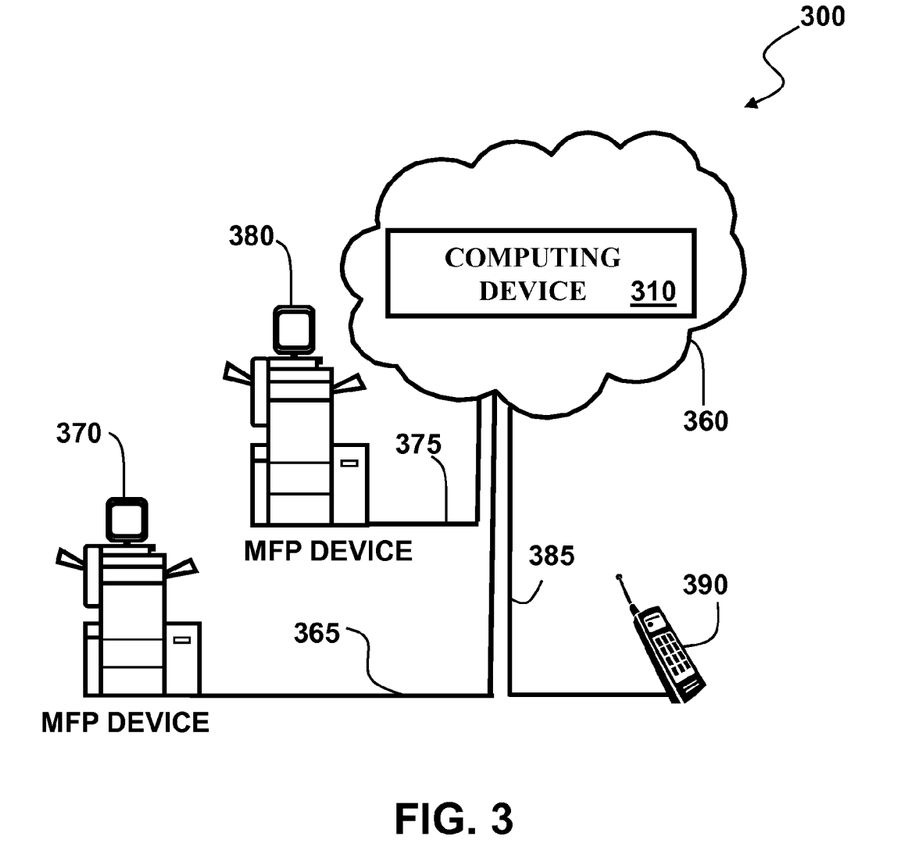
FIG. 3 depicts an exemplary embodiment of the computing system that includes a computing device hosted on a remote server, a first MFP device, a second MFP device, and a smart phone device.

FIG. 3 depicts an exemplary embodiment of the computing system 300, comprising a computing device 310 hosted on a remote server, e.g., a cloud server 360, a first MFP device 370, a second MFP device 380, and a smart phone device 390. In some embodiments, the computing device 310 may, for example, be hosted on a cloud server 360, where the cloud server may be configured, via multi-core processors and cloud-specific operating systems, for the delivery of services. A resource requester may be, for example, a smart phone device 390 and may be connected to the internet through a data cellular network 385, for example, via a 3G or 4G cellular wireless standard. A resource provider may be, for example, an MFP device 370 connected to a corporate network 365, 375 with access to the internet, e.g., via a T1 or T3 digital signal level line that may be operating over, e.g., copper or fiber optic cables. In one embodiment, the smart phone 390 may pair with a set of one or more MFPs 370, 380, and based on a set of properties that determine the supported functions of each individual MFP, may perform a pairing with that particular MFP. In one embodiment, the smart phone device 390 and MFP device 370 may communicate independently with the computing device 310, and the computing device 310 may establish the communication channel via, for example, performing a pairing process. Optionally, the resource requester and the resource provider may be a set of like devices, e.g., mobile devices, that may be requesting to be paired with each other.

Figure 4:
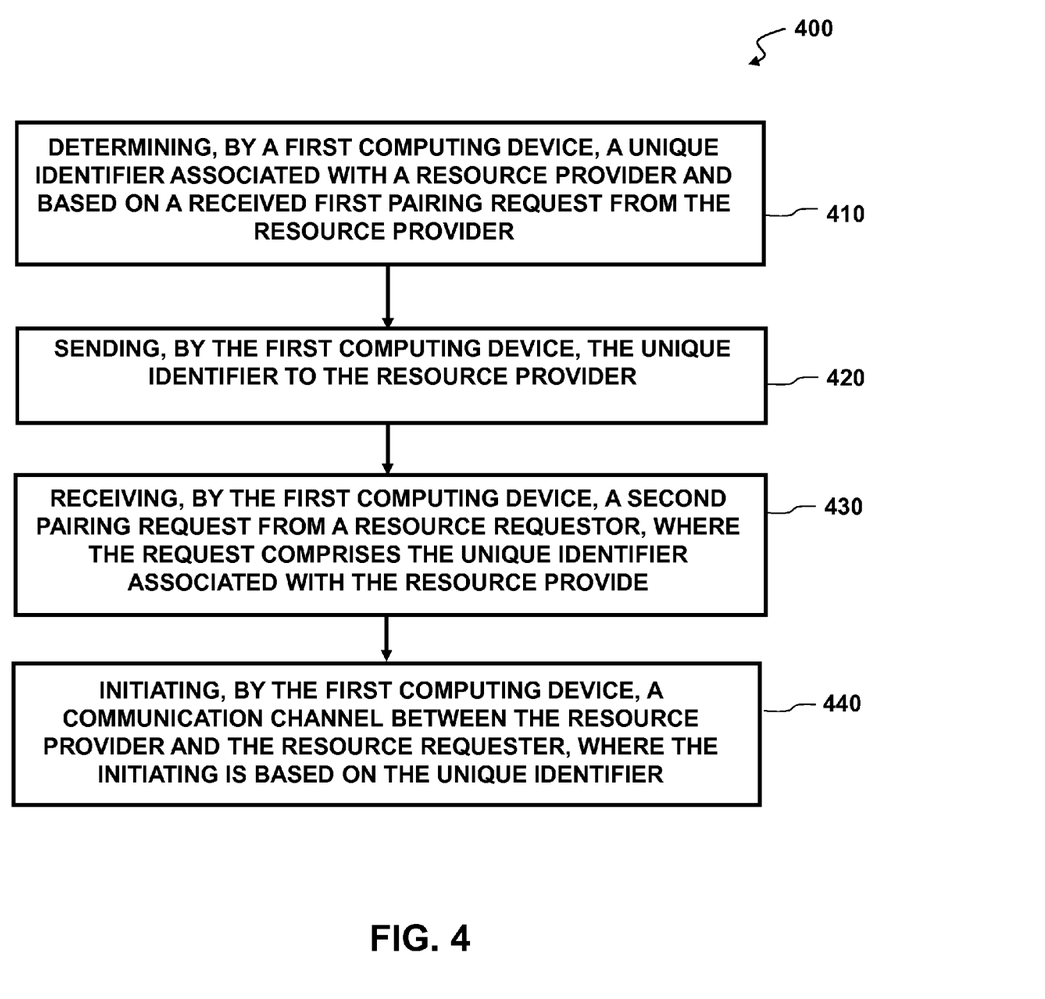
FIG. 4 is a flowchart depicting an exemplary process establishing a communication channel.

FIG. 4 is a flowchart of an exemplary process 400 establishing a communication channel in which the system comprises a computer and/or computing circuitry that may be configured to execute the steps as depicted. The method depicted in the flowchart includes the steps of: (a) determining, by a first computing device, a unique identifier associated with a resource provider, and based on a received first pairing request from the resource provider (step 410); (b) sending, by the first computing device, the unique identifier to the resource provider (step 420); (c) receiving, by the first computing device, a second pairing request from a resource requestor, where the request comprises the unique identifier associated with the resource provider (step 430); and (d) initiating, by the first computing device, a communication channel between the resource provider and the resource requester, where the initiating is based on the unique identifier (step 440).

Figure 5:
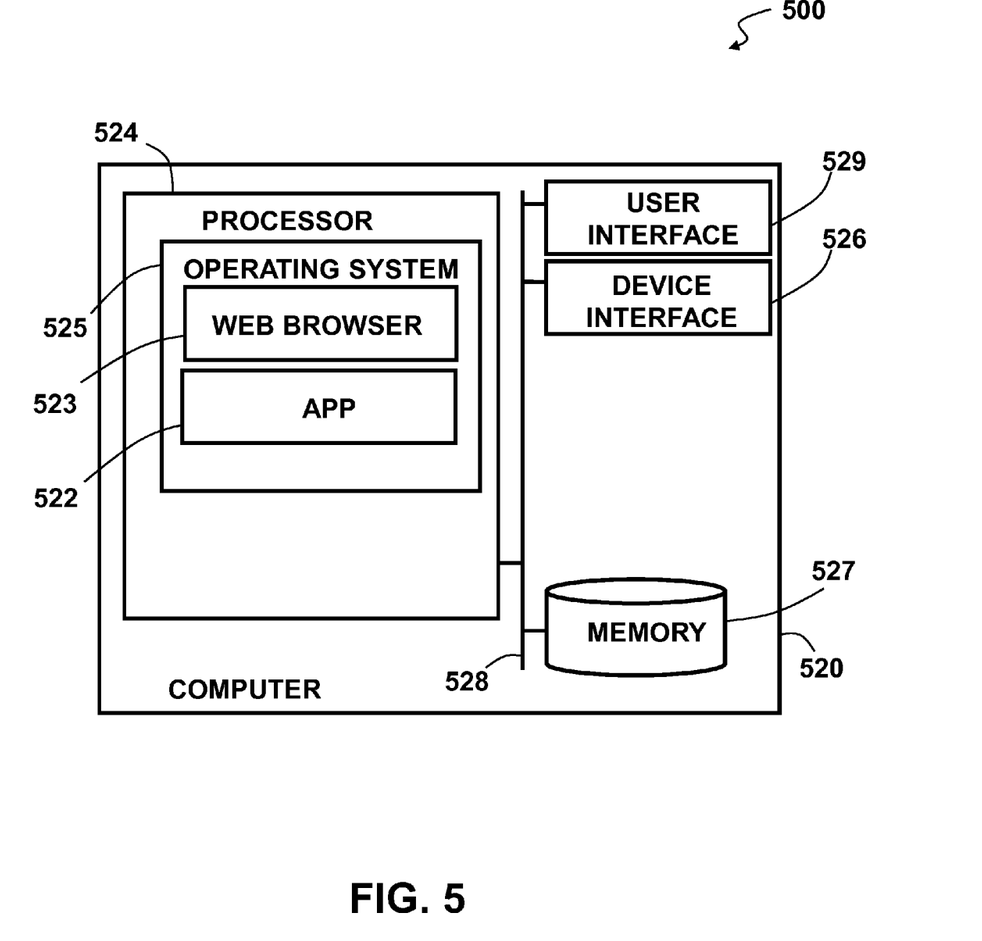
FIG. 5 illustrates an exemplary top level functional block diagram of a computing device embodiment.

FIG. 5 illustrates an exemplary top level functional block diagram of a computing device embodiment 500. The exemplary operating environment is shown as a computing device 520 comprising a processor 524, such as a central processing unit (CPU), addressable memory 527, an external device interface 526, e.g., an optional universal serial bus port and related processing, and/or an Ethernet port and related processing, and an optional user interface 529, e.g., an array of status lights and one or more toggle switches, and/or a display, and/or a keyboard and/or a pointer-mouse system and/or a touch screen. Optionally, the addressable memory may, for example, be: flash memory, eprom, and/or a disk drive or other hard drive. These elements may be in communication with one another via a data bus 528. Via an operating system 525 such as one supporting a web browser 523 and applications 522, the processor 524 may be configured to execute steps of a process establishing a communication channel according to the exemplary embodiments described above.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention is herein disclosed by way of examples and should not be limited by the particular disclosed embodiments described above.

What is claimed is:

1. A method comprising:
    determining, by a first computing device, a unique identifier associated with a resource provider, based on a received first pairing request from the resource provider identifying the resource provider as available to one or more resource requestors;
    sending, by the first computing device, the unique identifier to the resource provider;
    receiving, by the first computing device, a second pairing request from a resource requestor, wherein the request comprises the unique identifier associated with the resource provider;
    initiating, by the first computing device, a communication channel between the resource provider and the resource requester, wherein the initiating is based on the unique identifier;
    determining, by the first computing device, data pertaining to establishing a set of unique communication channels between the resource provider and the resource requester;
    transmitting, by the first computing device to a second computing device via a separate communication channel, a set of one or more attributes comprising the unique identifier and the determined data pertaining to establishing the set of unique communication channels, to effect transferring of data via the second computing device between the resource provider and the resource requester;
    invoking, by the second computing device, the set of unique communication channels to effect the data transmission between the resource provider and the resource requester, wherein the invocation of the set of unique communication channels is via a first communication channel with the resource provider and a second communication channel with the resource requester, thereby the second computing device is in direct communication with the resource provider and the resource requester after establishing, by the first computing device, the communication channel via completion of the initiating step, and establishing the separate communication channel based on the set of one or more attributes comprising the unique identifier received from the first computing device;
    monitoring, by the first computing device, the status of the initiated communication channel, wherein the status is based on at least one of: a received notification from the resource requester; and a received notification from the resource provider; and
    determining the presence of a disconnect in the communication channel between the resource provider and the resource requester.

2. The method of claim 1 wherein the resource provider establishes a set of rules for data communication.

3. The method of claim 2 wherein the second computing device modifies the data packet header from the resource requester based on the established set of rules by the resource provider.

4. The method of claim 3 wherein the second computing device modifies the data packet header from the resource requester based further on receiving a notification of pairing having been established.

5. The method of claim 1 further comprising:
    displaying, by the resource provider, the received unique identifier.

6. The method of claim 1 wherein the determined unique identifier is generated at the first computing device via a lookup table, the lookup table comprising a set of available resources.

7. The method of claim 1 wherein the resource provider is a multifunction peripheral (MFP) device.

8. The method of claim 1 wherein the resource requester is a portable mobile device.

9. The method of claim 1 wherein the first pairing request from the resource provider is sent when the resource provider is powered on.

10. The method of claim 1 wherein the first pairing request from the resource provider is sent when the resource provider is connected to the first computing device via a network connection.

11. The method of claim 1, wherein before initiating, by the first computing device, a communication channel, the resource requestor is associated with the resource provider based on at least one of: sensor readings and timing information of requests.

12. The method of claim 1 wherein the second computing device is external to the resource provider and the resource requester and the second computing device is behind a set of one or more network firewalls, thereby invoking, by the second computing device, the set of unique communication channels through the set of one or more network firewalls.

13. A system comprising: a first computing device, operably coupled to a resource provider via a communication medium, the first computing device configured to send a set of one or more unique identifiers, the first computing device comprising: a memory configured to store the set of one or more unique identifiers; a processor configured to: receive a first pairing request from the resource provider for a unique identifier associated with the resource provider; and initiate a communication channel based on a received pairing request from a resource requester and the unique identifier associated with the resource provider, wherein the unique identifier is generated based on the received first pairing request from the resource provider; and wherein the pairing request from the resource requester comprises the unique identifier; and transmit to a second computing device, a set of one or more attributes comprising the unique identifier to effect transferring of data between the resource provider and the resource requester; and a second computing device comprising a processor coupled to a memory configured to: invoke a set of unique communication channels to effect data transmission between the resource provider and the resource requester, wherein the invocation is via a first communication channel with the resource provider and a second communication channel with the resource requester, thereby the second computing device is in direct communication with the resource provider and the resource requester after establishing, by the first computing device, the communication channel via completion of the initiating, and based on the set of one or more attributes comprising the unique identifier received from the first computing device; and wherein the first computing device is further configured to: monitor the status of the initiated communication channel, wherein the status is based on at least one of: a received notification from the resource requester; and a received notification from the resource provider; and determine the presence of a disconnect in the communication channel between the resource provider and the resource requester.

14. The system of claim 13 wherein the unique identifier is generated via a lookup table, the lookup table comprising a set of available resources.

15. The system of claim 13 wherein the processor is further configured to:
monitor the status of the initiated communication channel, wherein the status is based on at least one of: a received notification from the resource requester; and a received notification from the resource provider; and
determine the presence of a disconnect in the communication channel between the resource provider and the resource requester.

16. A system comprising: a resource provider comprising a processor coupled to a memory configured to: send a first pairing request for a unique identifier associated with the resource provider; and a first computing device comprising a processor coupled to a memory configured to: receive the first pairing request from the resource provider; determine the unique identifier based on the received first pairing request from the resource provider; and initiate a communication channel based on a received pairing request from a resource requester and the unique identifier associated with the resource provider, and wherein the pairing request from the resource requester comprises the unique identifier; and transmit to a second computing device, a set of one or more attributes comprising the unique identifier to effect transferring of data between the resource provider and the resource requester; and a second computing device comprising a processor coupled to a memory configured to: invoke a set of unique communication channels to effect direct data transmission between the resource provider and the resource requester, wherein the invocation is via a first communication channel with the resource provider and a second communication channel with the resource requester, thereby the second computing device is in direct communication with the resource provider and the resource requester after establishing, by the first computing device, the communication channel via completion of the initiating, and based on the set of one or more attributes comprising the unique identifier received from the first computing device, and wherein the first computing device is further configured to: monitor the status of the initiated communication channel, wherein the status is based on at least one of: a received notification from the resource requester; and a received notification from the resource provider; and determine the presence of a disconnect in the communication channel between the resource provider and the resource requester.

* * * * *